(12) United States Patent
Strohl et al.

(10) Patent No.: US 6,358,412 B1
(45) Date of Patent: Mar. 19, 2002

(54) FEED SYSTEM FOR FUEL

(75) Inventors: Willi Strohl, Beilstein; Dietmar Schmieder, Markgroeningen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/600,783
(22) PCT Filed: Nov. 25, 1999
(86) PCT No.: PCT/DE99/03735
   § 371 Date: Jul. 21, 2000
   § 102(e) Date: Jul. 21, 2000
(87) PCT Pub. No.: WO00/43664
   PCT Pub. Date: Jul. 27, 2000

(30) Foreign Application Priority Data

Jan. 21, 1999 (DE) .......................... 199 02 239
Sep. 25, 1999 (DE) .......................... 199 46 024

(51) Int. Cl.⁷ .................... F02M 37/04; F04D 1/08; B01D 35/26; B01D 35/027
(52) U.S. Cl. .................... 210/172; 210/416.4; 123/509; 123/514
(58) Field of Search .............. 210/172, 416.4; 123/509, 514

(56) References Cited

U.S. PATENT DOCUMENTS

| | | | |
|---|---|---|---|
| 3,443,519 A | * | 5/1969 | White |
| 4,869,225 A | * | 9/1989 | Nagata et al. |
| 4,878,518 A | * | 11/1989 | Tuckey |
| 5,110,265 A | * | 5/1992 | Kato et al. |
| 5,452,701 A | * | 9/1995 | Tuckey |
| 5,564,396 A | * | 10/1996 | Kleppner et al. |
| 5,762,047 A | * | 6/1998 | Yoshioka et al. |
| 6,012,904 A | * | 1/2000 | Tuckey |

FOREIGN PATENT DOCUMENTS

| | | |
|---|---|---|
| DE | 41 02 323 A1 | 7/1992 |
| DE | 195 17 751 A1 | 11/1995 |
| DE | 195 18 755 A1 | 11/1995 |
| DE | 44 25 670 A | 1/1996 |
| DE | 44 28 254 A1 | 2/1996 |
| DE | 44 44 854 A | 6/1996 |
| DE | 44 44 854 A1 | 6/1996 |
| DE | 195 01 353 A | 7/1996 |
| DE | 195 09 143 A | 9/1996 |
| EP | 0 629 522 A | 12/1994 |
| EP | 863304 | * 9/1998 |

* cited by examiner

Primary Examiner—Thomas M. Lithgow
(74) Attorney, Agent, or Firm—Michael J. Striker

(57) ABSTRACT

A feed device for fuel has a feed pump driven by an electric motor and a housing which receives the electric motor. The feed pump and a filter arrangement which has a preliminary pump and a main pump arranged respectively before and behind the feed pump in the fuel flow direction are provided in the housing. The feed pump transports the main flow of fuel through a central recess in the filter pot at the input flow side of the main filter of the filter arrangement. A side channel pump which is open on one side is arranged at the feed pump as a preliminary stage thereof. The fuel can be delivered subsequent to the preliminary filter to a rise pipe and then into a pot housing to a suction area of the main stage of the feed pump.

7 Claims, 2 Drawing Sheets

FEED SYSTEM FOR FUEL

PRIOR ART

Figure 1:
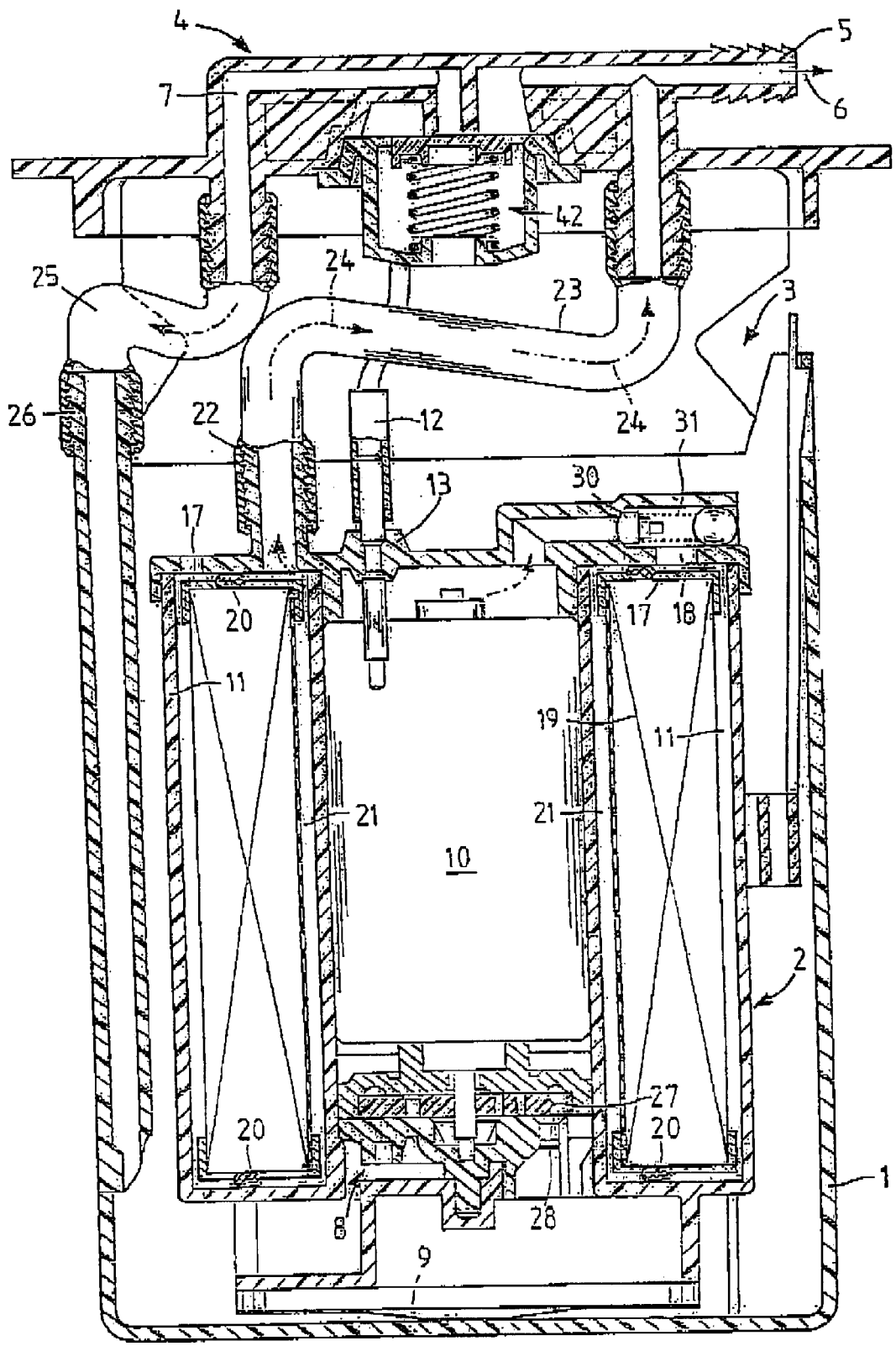

The invention is directed to a feed device for fuel according to the preamble of the main claim.

Feed devices for fuel of the type mentioned above in which the fuel is conveyed from a fuel tank, for example, to an injection system of the internal combustion engine of a motor vehicle are already known.

A feed device of this type is known from DE 44 44 854 A1 in which the feed pump is driven by an electric motor and the fuel flows through a preliminary filter before the feed pump and, under delivery pressure, through a main filter following the feed pump. These structural component parts are arranged in a filter pot with removable cover; the electric motor and feed pump are located in a central chamber and the main filter is located in an annular chamber arranged concentrically around the central chamber.

When mounting the feed pump in the filter pot, the greatest possible tightness must be observed between the pump parts and the filter pot housing parts. Further, in the known arrangement a relatively large initial priming quantity must first be delivered by the fuel pump before the non-return valve or check valve opens the fuel path to the main filter.

ADVANTAGES OF THE INVENTION

The feed device for fuel described above with the inventive features of the characterizing part of the main claim is advantageous in that a side channel pump is arranged in addition at the feed pump as a preliminary stage, the fuel being conveyed in this side channel pump to the intake or suction area of a main stage via a rise pipe in the pot housing, this rise pipe preferably being located laterally next to the pot housing.

Advantageously, in the arrangement according to the invention, only a relatively small initial priming quantity is required in the fuel tank, since the fuel is sucked in via the preliminary stage whose intake connection piece can be located close to the bottom of the tank. After the preliminary stage, the fuel flows through the rise pipe directly into the pot housing so that a check valve or the starting valve which would otherwise be necessary can be eliminated. Idle running of the pot housing is also extensively prevented at the conclusion of fuel delivery because idling is possible in this case only by way of the tight seal between the preliminary stage and the main stage, which can be prevented by optimal sealing. Also, good residual purging of the pot housing can be carried out with the invention.

By suitable dimensioning of the side channel pump, in particular with an appropriate diameter of the impeller of the feed pump, the pump capacity of this preliminary stage in the feed pump can be selected in such a way that the rise pipe is filled directly by the side channel pump.

However, it is especially advantageous when a jet nozzle is arranged between the output of the side channel pump and the rise pipe; this results in an increased filling rate of the pot housing should the delivery rate of the side channel pump be too low. The pressure in the jet nozzle can be generated in a simple manner by means of the side channel pump; the necessary pressure can be built up with great accuracy by the side channel pump acting as preliminary stage, which results in an improved pot filling rate.

To prevent fuel losses in the pot housing when the vehicle which is driven by the fuel is stopped, it is advantageous when the side channel pump is integrated in the impeller of the feed pump and when the impeller of the fed pump rests as flat as possible on a corresponding adjoining surface of a suction cover of the feed pump. Not only is an optimal sealing of the main stage achieved in this way, but the sealing of the main stage relative to the preliminary stage is also advantageously ensured. To prevent possible axial forces, pressure pockets which make it possible to compensate for axial forces through pressure differences at the impeller can also be arranged in the area of the support surfaces of the impeller, so that fewer frictional forces occur and improved efficiency is accordingly achieved.

These and other features of preferred further developments of the invention follow from the claims as well as from the description and drawings. The individual features can be realized independently or together in the form of subcombinations in the embodiment form of the invention and in other fields and can constitute advantageous constructions which are also patentable per se and for which protection is claimed herein.

DRAWING

An embodiment example of the feed device for fuel according to the invention will be described with reference to the drawings.

Figure 2:
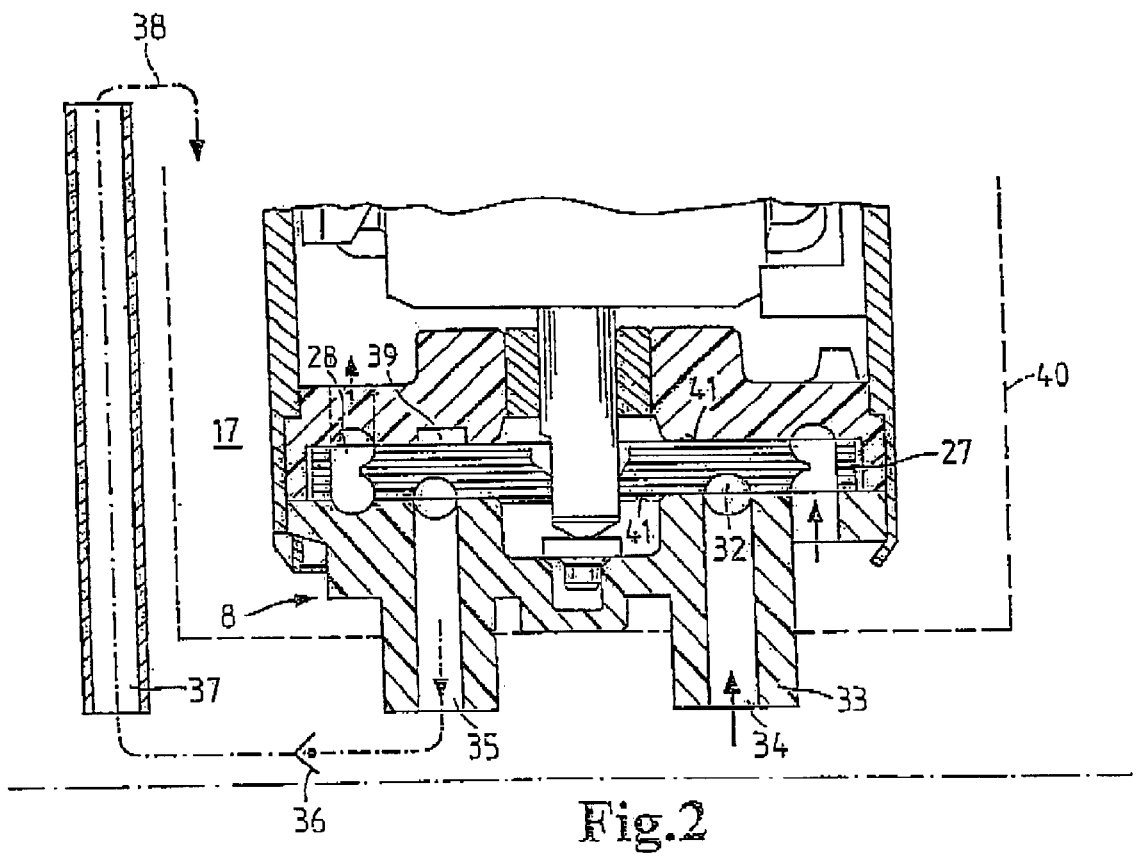

FIG. 1 shows a fuel feed module with a feed pump according to the prior art; and FIG. 2 shows an embodiment example, according to the invention, of a feed pump with a side channel pump.

DESCRIPTION OF THE EMBODIMENT EXAMPLE

FIG. 1 shows a fuel feed module known from the prior art with a longitudinal section of a fuel tank 1 with a feed device 2 which can be inserted into the fuel tank 1 from the top through an opening 3 in the fuel tank 1. The opening 3 can be closed by a tank flange 4. A connection piece 5 for a feed line, not shown, which leads to the internal combustion engine of a motor vehicle and transports the fuel as indicated by arrow 6 is located at the tank flange 4. A connection for a fuel return line 7 coming from the internal combustion engine and a pressure regulator 42, whose operation need not be further elaborated for understanding the invention, are also arranged at the tank flange 4.

The feed device 2 contains, in the lower area, a feed pump 8 which sucks fuel out of the bottom region of the fuel tank 1 via a preliminary filter 9. The feed pump is driven by an electric motor 10 which is located above the feed pump 8 centrally in a filter pot 11 as housing. The electric motor 10 is supplied with the necessary electrical energy via connection lines 12 in a cover 13. In FIG. 1, the feed pump known from the prior art is provided with a pump impeller 27, the fuel being transported to a pump space 28 in the main stage.

Above the electric motor 10, the fuel delivered to this main stage of the feed pump 8 reaches a check valve 30 which gives way to the pressure of a spring 31 when sufficiently filled with fuel and lets the fuel flow into an outer chamber 17 according to arrow 18 on the input flow side of a main filter element 19 in the filter pot 11. The main filter element 19 or filter pot 11 is divided by ring seals 20 into the outer chamber 17 on the input flow side and an inner chamber 21. The fuel which is filtered as it flows through the main filter element 19 flows from the inner chamber 21 to a connection piece 22.

The connection piece 22 is followed by a pipe connection 23 which produces a connection with the tank flange 4 so that the fuel can flow from the inner chamber 21 in the filter pot 11 to the outer feed line as indicated by arrows 24 and 6. The fuel return line 7 is also connected to a connection piece 26 of the fuel tank 1 via a pipe connection 25.

FIG. 2 shows a further development of the feed pump 8 according to the invention which is expanded, compared to the known feed pump 8 shown in FIG. 1, by a preliminary stage 32 to form a side channel pump. In the pump impeller 27, the main stage 28 is realized in the same manner as in the prior art. However, in this case, a suction cover 33 of the feed pump 8 has an inlet 34 for the fuel that is sucked in from the tank bottom by the preliminary stage 32; this fuel is transported by the pump impeller 27 in the pump space of the preliminary stage 32 to an outlet 35 accompanied by an increase in liquid pressure.

The preliminary stage 32 is constructed as a side channel pump open on one side in the impeller 27. The preliminary stage 32 is constructed in the impeller 27 so as to open toward the side facing the inlet 34, i.e., toward the side facing the tank bottom. Therefore, when the feed device is stopped, the impeller 27 is pressed on the suction cover 33 of the feed pump 8 due to the static pressure. The main stage 28 is accordingly sealed toward the preliminary stage 32. Fuel can no longer flow back into the tank bottom from the pot 40 via the preliminary stage 32. The axial gap between the preliminary stage 32 and the main stage 28 is sealed by the force of gravity of the impeller 27 and by the static pressure. For this purpose, the two surfaces must be able to contact one another tightly.

The pump space of the preliminary stage 32, a segment of which extends in circular shape into the impeller 27, is preferably so disposed that it neighbors on the pump space of the main stage 28 in such a way that the suction areas and low-pressure areas, respectively, of the main stage 28 and preliminary stage 32 are situated opposite one another. In this way, leakage losses between these pump spaces can be prevented to a great extent because, in this case, the relatively shorter pump space of the preliminary stage 32 does not extend into the areas of relatively high pressure in the main stage 28.

From the outlet 35, the fuel is conducted by means of a jet nozzle 36 to a side pipe 37 and, through this side pipe 37, into a pot housing 40 according to arrow 38. With suitable dimensioning of the pump space in the preliminary stage 32 and of the diameter of the pump impeller 27, the pump capacity of this preliminary stage can be selected in such a way that the pot housing 40 is also filled directly without the jet nozzle 36 in an embodiment form which is not shown here.

The support surfaces 41 of the pump impeller 27 at the housing of the feed pump 8 and particularly at the suction cover 33 are extensively flat so that it can be ensured that the least possible fuel losses can be expected in the feed pump 8. Further, in order to prevent the possible occurrence of excessive axial forces at the pump impeller 27, pressure pockets 39 can also be arranged between the impeller 27 and the housing of the feed pump 8. These axial forces occur due to the higher pressure of the fuel on the upper side of the impeller 27 relative to the pressure on the side contacting the suction cover 33.

What is claimed is:

1. A feed device for fuel, comprising a housing (11), a feed pump (8), an electric motor (10) for driving said feed pump, a filter arrangement including a preliminary filter (9) arranged before said feed pump in a fuel flow direction and a main filter arranged behind said feed pump in said direction, said feed pump, said electric motor and said filter arrangement being received in said housing, said feed pump transporting a main flow of the fuel sucked via said preliminary filter (9) into a main stage (28) of said feed pump after said preliminary filter and through a central recess in a filter pot at an input flow side of said main filter (19) of said filter arrangement, said feed pump including a pump impeller (27) and a side channel pump arranged thereat and forming a preliminary stage (32) of said feed pump, said feed pump further comprising a rise pipe (37) and a pot housing (40), said side channel pump delivering fuel to suction areas of said main stage after said preliminary filter (9) and via said rise pipe (37) and said pot housing (40), said side channel pump being configured to open into said impeller (27) on one side thereof facing a bottom of said housing (11).

2. The feed device according to claim 1, wherein said feed pump includes a suction cover (33) facing said impeller and wherein a surface of said pump impeller facing said suction cover and a surface of said suction cover facing said impeller rest tightly one against another in an area between said preliminary stage (32) and said main stage (28).

3. The feed device according to claim 2, wherein said side channel pump is integrated with said pump impeller (27), said pump impeller resting essentially flat on a corresponding surface of said suction cover (33) of said feed pump.

4. The feed device according to claim 1, wherein pressure pockets (39) are formed in an area of a support surface of said pump impeller.

5. The feed device according to claim 1, wherein said main stage (28) is provided in said pump impeller (27).

6. The feed device according to claim 5, wherein a pump space of said preliminary stage (32) is disposed adjacent to a pump space of said main stage (28) such that suction areas thereof are situated opposite one another.

7. The feed device according to claim 1, and further comprising a jet nozzle (36) positioned between an output of said side channel pump and said rise pipe (37), wherein pressure in said jet nozzle is built up by said side channel pump.

* * * * *